(12) United States Patent
Lim et al.

(10) Patent No.: US 12,533,754 B2
(45) Date of Patent: Jan. 27, 2026

(54) WELDING QUALITY INSPECTION DEVICE AND WELDING QUALITY INSPECTION METHOD

(71) Applicant: LG ENERGY SOLUTION, LTD., Seoul (KR)

(72) Inventors: Jae Won Lim, Daejeon (KR); Je Jun Lee, Daejeon (KR); Hak Kyun Kim, Daejeon (KR); Hong Jae Mun, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 225 days.

(21) Appl. No.: 18/267,039

(22) PCT Filed: Mar. 8, 2022

(86) PCT No.: PCT/KR2022/003269
§ 371 (c)(1),
(2) Date: Jun. 13, 2023

(87) PCT Pub. No.: WO2022/191581
PCT Pub. Date: Sep. 15, 2022

(65) Prior Publication Data
US 2024/0042557 A1 Feb. 8, 2024

(30) Foreign Application Priority Data
Mar. 8, 2021 (KR) .................. 10-2021-0030275

(51) Int. Cl.
*B23K 31/12* (2006.01)
*B23K 101/34* (2006.01)
(Continued)

(52) U.S. Cl.
CPC ........... *B23K 31/125* (2013.01); *G01N 27/20* (2013.01); *H01M 50/534* (2021.01);
(Continued)

(58) Field of Classification Search
CPC .............. B23K 31/125; B23K 2101/34; B23K 2101/36; B23K 2103/02; B23K 2103/10;
(Continued)

(56) References Cited

U.S. PATENT DOCUMENTS 7,988,745 B2 8/2011 Okabe et al.
9,040,191 B2 5/2015 Yoon et al.
(Continued)

FOREIGN PATENT DOCUMENTS

CN 107863481 A 3/2018
JP 6-31461 A 2/1994
(Continued)

OTHER PUBLICATIONS

International Search Report for PCT/KR2022/003269 mailed on Jun. 20, 2022.
(Continued)

*Primary Examiner* — Feba Pothen
(74) *Attorney, Agent, or Firm* — Birch, Stewart, Kolasch & Birch, LLP (57) ABSTRACT

Discussed is a welding quality inspection apparatus that can include a measurement unit including a first resistance measurement member to measure a first resistance value by directly contacting a first measurement point and a second resistance measurement member to measure a second resistance value by directly contacting a second measurement point; and a control unit to judge that a welding defect occurs and sorts a defective item when the first resistance value or the second resistance value obtained from the measurement unit exceeds a threshold resistance value. The first measurement point may be positioned on a first electrode terminal exposed to an outside of the secondary battery, and the second measurement point may be posi-
(Continued)

tioned on the welding portion of the first electrode current collector provided inside the secondary battery.

23 Claims, 4 Drawing Sheets

(51) Int. Cl.
    *B23K 101/36*     (2006.01)
    *B23K 103/02*     (2006.01)
    *G01N 27/20*     (2006.01)
    *H01M 50/534*     (2021.01)
    *H01M 50/562*     (2021.01)
    *H01M 50/566*     (2021.01)
    *B23K 103/10*     (2006.01)

(52) U.S. Cl.
    CPC ....... *H01M 50/562* (2021.01); *H01M 50/566* (2021.01); *B23K 2101/34* (2018.08); *B23K 2101/36* (2018.08); *B23K 2103/02* (2018.08); *B23K 2103/10* (2018.08)

(58) Field of Classification Search
    CPC .. G01N 27/20; H01M 50/534; H01M 50/562; H01M 50/566; H01M 10/4285; H01M 50/559; Y02E 60/10; Y02P 70/50
    See application file for complete search history.

(56) References Cited

U.S. PATENT DOCUMENTS

2017/0322168 A1     11/2017   Lupienski et al.
2022/0152725 A1     5/2022   Koo et al.

FOREIGN PATENT DOCUMENTS

| | | |
|---|---|---|
| JP | 2000-268887 A | 9/2000 |
| JP | 2001-332308 A | 11/2001 |
| JP | 5082861 B2 | 11/2012 |
| JP | 2019060769 A * | 4/2019 |
| KR | 10-2007-0081533 A | 8/2007 |
| KR | 10-0922352 B1 | 10/2009 |
| KR | 10-2017-0110331 A | 10/2017 |
| KR | 10-2017-0125707 A | 11/2017 |
| KR | 10-1887148 B1 | 8/2018 |
| KR | 10-2021-0014482 A | 2/2021 |
| WO | WO2021/020892 A1 | 2/2021 |

OTHER PUBLICATIONS

Extended European Search Report for European Application No. 22767477.7, dated Aug. 6, 2024.

* cited by examiner

WELDING QUALITY INSPECTION DEVICE AND WELDING QUALITY INSPECTION METHOD

TECHNICAL FIELD

This application claims priority to and the benefit of Korean Patent Application No. 10-2021-0030275 filed in the Korean Intellectual Property Office on Mar. 8, 2021, the entire contents of which are incorporated herein by reference.

The present invention relates to a welding quality inspection apparatus and a welding quality inspection method.

BACKGROUND ART

A conventional cylindrical secondary battery has a structure in which a tab linking a jelly-roll electrode assembly and an external terminal is welded and connected to a foil of a jelly-roll electrode assembly. The cylindrical secondary battery having such a structure has a problem in that a current path is limited and resistance of the jelly-roll electrode assembly itself is high.

In order to improve this, there is an attempt to decrease the resistance in order to increase the number of tabs, but there is a limit to sufficiently ensure the current path or decrease the resistance to a desired level.

In order to resolve the above-mentioned limit, the development of the cylindrical secondary battery which achieves reduction of the resistance of the jelly-roll electrode assembly itself is in progress in many ways. With the development of the cylindrical secondary battery, the development of an apparatus and a method that can inspect a welding quality of the cylindrical secondary battery more closely is also required jointly.

During a welding process, a monitoring system can be applied, which processes a defect when an error is detected by combining various signals, but the monitoring system is unsuitable for process management due to a low sorting ability and a high mis-inspection rate.

DISCLOSURE

Technical Problem

An object of the present invention is to provide a welding quality inspection apparatus and a welding quality inspection method can sort a welding defect (or soft welding) by measuring resistances welding portions of an electrode terminal and an electrode current collector in order to check a stable connection of the electrode terminal and the electrode current collector in the secondary battery.

However, an object to be solved by the present invention is not limited to the above-described object, and other objects not mentioned herein may be clearly understood from the description of the invention described later by those skilled in the art.

Technical Solution

According to one aspect of the present, provided is a welding quality inspection apparatus for a welding portion of a secondary battery that includes an electrode assembly in which a first electrode, a separator, and a second electrode are stacked and wound, and a first electrode current collector provided on one end portion of the electrode assembly, where the welding quality inspection apparatus includes:

a measurement unit including a first resistance measurement member configured to measure a first resistance value by directly contacting a first measurement point and a second resistance measurement member configured to measure a second resistance value by directly contacting a second measurement point; and a control unit configured to judge that a welding defect occurs and sorts a defective item when at least one of the first resistance value and the second resistance value obtained from the measurement unit exceeds a threshold resistance value.

The first measurement may be positioned on a first electrode terminal exposed to the outside of the secondary battery.

The second measurement point may be positioned on the welding portion of the first electrode current collector provided inside the secondary battery.

The second resistance measurement member may contact the welding portion of the first electrode current collector which exists inside the secondary battery through a winding hole of the electrode assembly at a location opposite to the first electrode terminal.

According to another aspect of the present invention, provided is a welding quality inspection method for a welding portion of a secondary battery that includes an electrode assembly in which a first electrode, a separator, and a second electrode are stacked and wound and a first electrode current collector provided on one end portion of the electrode assembly, where the welding quality inspection method includes:

measuring a first resistance value by directly contacting a first resistance measurement member with a first measurement point;

measuring a second resistance value by directly contacting a second resistance measurement member with a second measurement point; and judging a welding quality by comparing at least one of the first resistance value and the second resistance value with a threshold resistance value.

The first measurement may be positioned on a first electrode terminal exposed to an outside of the secondary battery.

The second measurement point may be positioned on the welding portion of the first electrode current collector provided inside the secondary battery.

The second resistance measurement member may contact the welding portion of the first electrode current collector which exists inside the secondary battery through a winding hole of the electrode assembly opposite to the first electrode terminal.

Advantageous Effects

A welding quality inspection apparatus according to one aspect of the present invention can effectively sort a welding defect portion or a soft welding portion through a resistance measurement member which measures resistance in direct contact with a welding portion or an electrode terminal without damage to welding portions of the electrode terminal and an electrode current collector, and thereby enhance a welding quality.

However, the effects which can be obtained through the present invention are not limited only to the above-described effects, and other technical effects not mentioned herein will be able to be clearly understood from the description of the invention to be described later by those skilled in the art.

EXPLANATION OF REFERENCE NUMERALS AND SYMBOLS

1: First electrode terminal
2: First electrode current collector
7: Second electrode current collector
7a: Hole of second electrode current collector
3, 6: Non-coated portion
4: Electrode assembly
5: Winding hole
8: Tab gripper
9: First resistance measurement member
10: Second resistance measurement member
11: First measurement point
12: Second measurement point
13: Through-hole
A. Battery can
B: Sealing portion
C: Opening portion
100: Body portion
200: Elastic portion
300: Tip portion

BEST MODE FOR THE INVENTION

Hereinafter, terms or words used in the present specification will be described in detail.

In the present specification, terms including as first, second, A, B, and the like are used for describing various constituent elements, but the constituent elements are not limited by the terms. The terms are used only to discriminate one element from another element. For example, a first component may be referred to as a second component, and similarly, the second component may be referred to as the first component without departing from the scope of the present invention.

Terms such as a certain component is "connected", "accessed", "contacted", etc., to another component may mean that a certain component is directly connected to another component or connected to another component through an intermediate component unless separately specified in the present specification.

In the present specification, when it is described that a certain part is located "above" another part, it means that the certain part may be located "directly above" on the another part and a third part may be interposed therebetween as well. In addition, to be referred to as "on" a reference portion is located above or below the reference portion, and does not particularly mean to being located in the direction opposite to gravity.

In the present specification, when a certain component is expressed as a singular number, the certain component may include a plurality of concepts even though is not separately specified in the present specification. In the present specification, in respect to terms such as "include", "have", etc., unless separately specified in the present specification, a feature, a number, a step, an operation, a process, a component, a member, etc., or a combination thereof mean an existence itself, and does not mean excluding another feature, another number, etc.

In the present specification, a secondary battery refers to a battery which is repeatedly usable for along time through recharging. The secondary battery may be categorized into a nickel-cadmium battery, a lithium ion secondary battery, etc., according to an electrode active material. The secondary battery may be categorized into a pouch type secondary battery, a square type secondary battery, a cylindrical secondary battery, etc., according to a type.

In the present specification, the cylindrical secondary battery refers to a secondary battery having a cylinder shape or a type similar thereto. The cylindrical secondary battery which is generally used for large-capacity electronic and electric devices due to a characteristic in which energy density per volume is high may be used in a form in which a plurality of cylindrical secondary batteries are combined to constitute a battery pack.

According to an embodiment, the cylindrical secondary battery may have, for example, a structure in which a rivet penetrated and inserted into a bottom surface opposite to the opening portion of the cylindrical secondary battery is used as a cathode and a battery can itself is used as an anode.

In the present specification, the secondary battery may include a battery can receiving an electrode assembly. The battery can may be cylindrical, and in respect to a size of the battery can, circular diameter of both end portions may be 30 to 55 mm and a height may be 60 to 120 mm. For example, the circular diameter×the height of the cylindrical battery can may be 46 mm×60 mm, 46 mm×80 mm, or 46 mm×90 mm, or 46 mm×120 mm.

Preferably, the cylindrical secondary battery may be, for example, a cylindrical secondary battery in which a ratio of a form factor (defined as a value acquired by dividing the diameter of the cylindrical secondary battery by the height, i.e., a ratio of a diameter Φ to a height H) is larger than approximately 0.4.

Here, the form factor means values representing the diameter and the height of the cylindrical secondary battery. The cylindrical secondary battery according to an embodiment of the present invention may be, for example, 46110 cell, 48750 cell, 48110 cell, 48800 cell, 46800 cell, and 46900 cell. In a numerical value representing the form factor, two preceding numbers represents the diameter of the cell, two subsequent numbers represent the height of the cell, and the last number 0 represent that a cross section of the cell is circular.

The cylindrical secondary battery according to the present specification, for example, as a substantially cylinder shape cell may be a cylindrical secondary battery in which the diameter is approximately 46 mm, the height is approximately 110 mm, and the ratio of the form factor is approximately 0.418.

The cylindrical secondary battery according to the present specification, for example, as a substantially cylinder shape cell may be a battery cell in which the diameter is approximately 48 mm, the height is approximately 75 mm, and the ratio of the form factor is approximately 0.640.

The cylindrical secondary battery according to the present specification, for example, as a substantially cylinder shape cell may be a cylindrical secondary battery in which the diameter is approximately 48 mm, the height is approximately 110 mm, and the ratio of the form factor is approximately 0.418.

The cylindrical secondary battery according to the present specification, for example, as a substantially cylinder shape cell may be a battery cell in which the diameter is approximately 48 mm, the height is approximately 80 mm, and the ratio of the form factor is approximately 0.600.

The cylindrical secondary battery according to the present specification, for example, as a substantially cylinder shape cell may be a battery cell in which the diameter is approximately 46 mm, the height is approximately 80 mm, and the ratio of the form factor is approximately 0.575.

The cylindrical secondary battery according to the present specification, for example, as a substantially cylinder shape cell may be a cylindrical secondary battery in which the diameter is approximately 46 mm, the height is approximately 90 mm, and the ratio of the form factor is 0.511.

If it is not contrarily defined, all terms used herein including technological or scientific terms have the same meanings as those generally understood by a person with ordinary skill in the art.

Hereinafter, a comparative example or a preferred implementation example according to the present invention will be described in detail with reference to the accompanying drawings.

Figure 1:
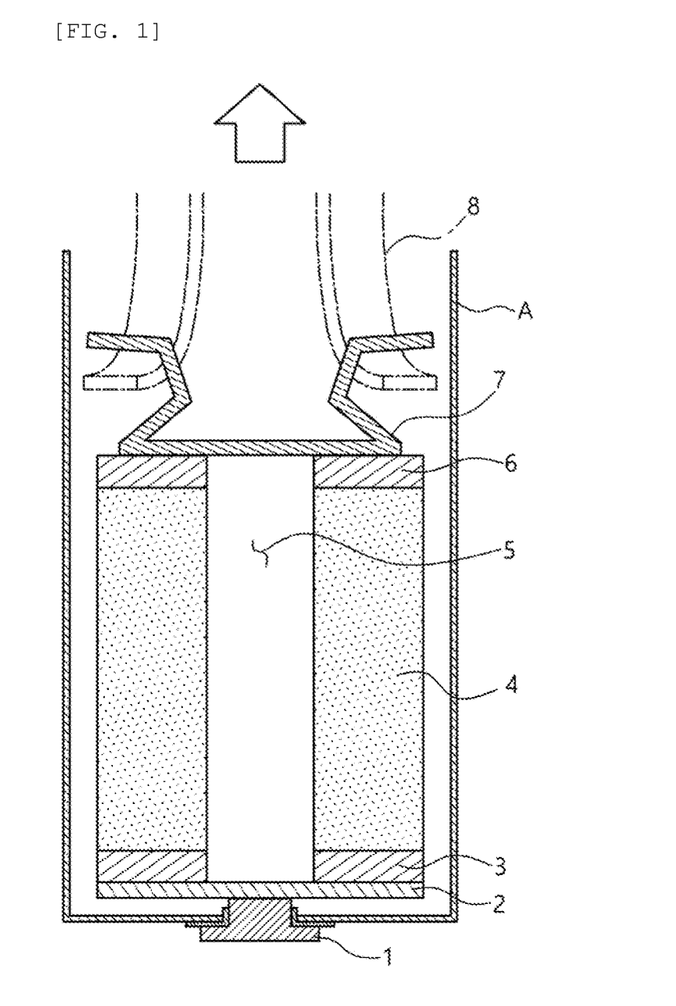
FIG. 1 illustrates a welding quality inspection apparatus according to one comparative example of the present invention.

In this regard, referring to FIG. 1, in the secondary battery, a welding quality inspection apparatus according to one comparative example is illustrated. Here, as the secondary battery, the cylindrical secondary battery is illustrated, which has a structure in which a rivet penetrated and inserted into a bottom surface opposite to the opening portion of the cylindrical secondary battery is used as a cathode and a battery can itself is used as an anode.

In the welding quality inspection according to one comparative example, first and second electrode current collectors 2 and 7 are pulled with a gripper 8 to perform the welding quality inspection. However, when the welding inspection is performed by the welding quality inspection apparatus according to one comparative example, tensile force is applied to welding portions of the electrode terminal and the electrode current collector, and there is a concern about occurrence of damage. In particular, when the welding quality inspection is to be performed for a first electrode current collector 2, there is a limit that a battery can A should be disassembled and pulled with the gripper 8. Due to such a limit, there is a disadvantage in that the welding quality inspection may not be performed for the secondary battery, and the welding quality inspection may not be completely performed by sampling there extremely some of various secondary batteries. This may cause welding quality deterioration or reliability deterioration in an overall term of manufacturing the secondary battery.

According to one implementation example of the present invention, provided is a welding quality inspection apparatus for a welding portion of a secondary battery including an electrode assembly wound in which a first electrode, a separator, and a second electrode are stacked and wound and a first electrode current collector provided on one end portion of the electrode assembly, a measurement unit including a first resistance measurement member measuring a resistance value by directing contacting a first measurement point and a second resistance measurement member measuring the resistance value by directly contacting a second measurement point; and a control unit judges that a welding defect occurs and sorts a defective item when the resistance values obtained from the measurement unit exceeds a threshold resistance value, in which the first measurement point is positioned on a first electrode terminal exposed to the outside of the secondary battery, the second measurement point is positioned on the welding portion of the first electrode current collector provided inside the secondary battery, and the second resistance measurement member contacts the welding portion of the first electrode current collector which exists inside the secondary battery through a winding hole of the electrode assembly opposite to the first electrode terminal.

Figure 2:
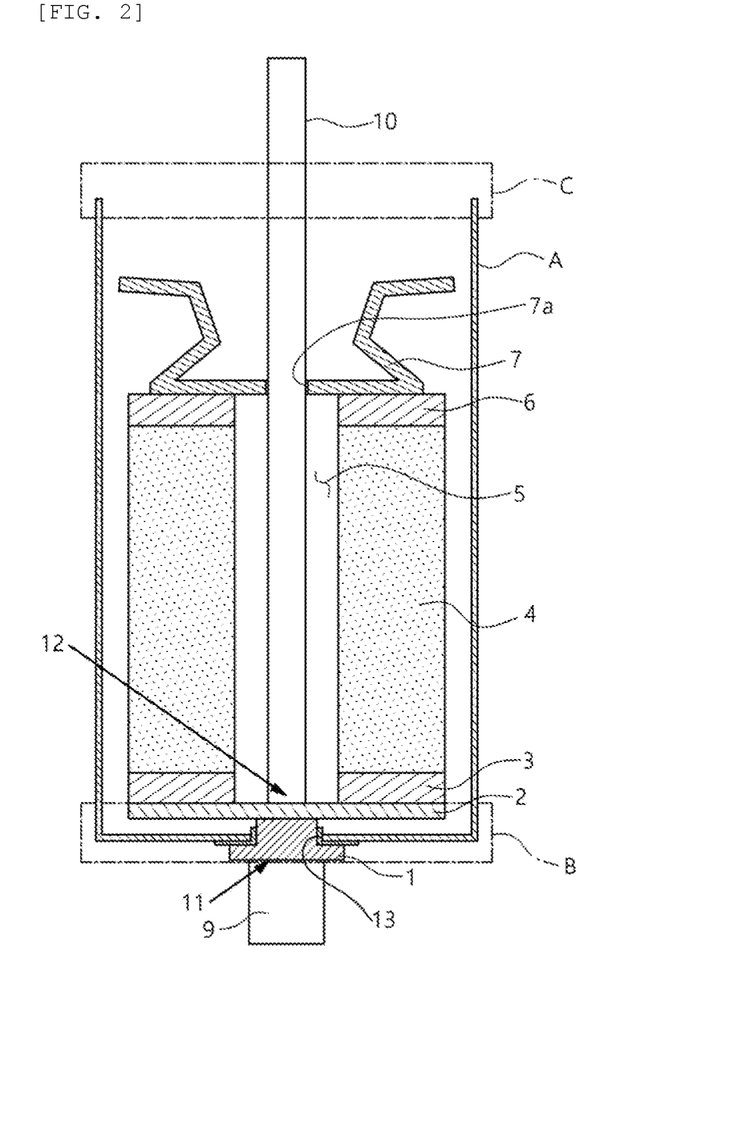
FIG. 2 illustrates a welding quality inspection apparatus according to an embodiment of the present invention.
Figure 4:
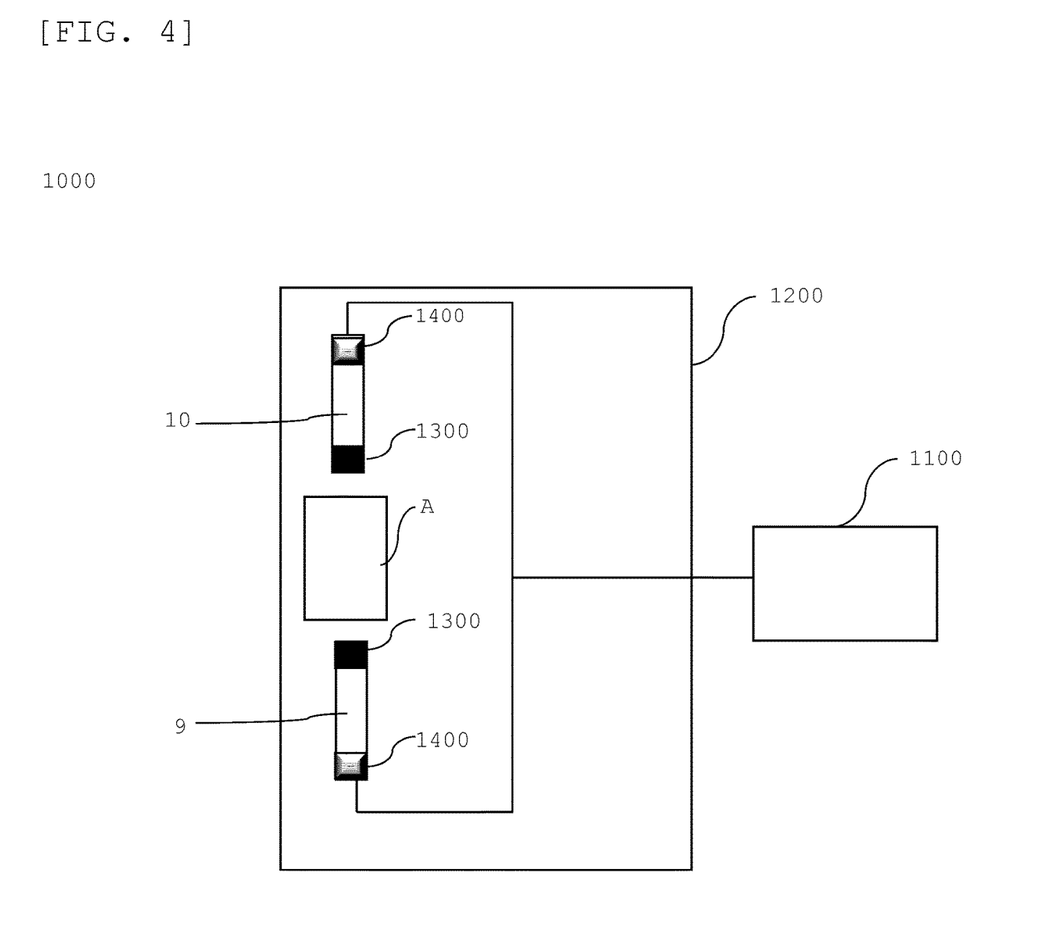
FIG. 4 illustrates a welding quality inspection apparatus according to the embodiment of the present invention of FIG. 3.

In regard to the implementation example, referring to FIG. 2 and FIG. 4, a welding quality inspection apparatus 1000 according to an embodiment of the present invention, in the secondary battery is illustrated.

The measurement unit 1200 includes a first resistance measurement member 9 directly contacting a first measurement point 11 and a second resistance measurement member 10 directly contacting a second measurement point 12.

The control unit 1100 judges that a welding defect (or soft welding) and sorts a defective item when the resistance value obtained from the measurement unit 1200 exceeds a threshold resistance value.

In the present specification, the threshold resistance value means a maximum resistance value in which it may be judged that normal welding occurs.

The first measurement point 11 is positioned on the first electrode terminal 1 exposed to the outside of the secondary battery, and the second measurement point 12 is positioned on the welding portion of the first electrode current collector which exists inside the secondary battery.

The welding portion of the first electrode current collector may mean a welding portion between the first electrode current collector 2 and the first electrode terminal 1, and in the welding quality inspection apparatus according to the implementation example, the tensile force is not applied to the welding portion of the first electrode terminal 1 and the first electrode current collector 2 and the first and second resistance measurement members 9 and 10 directly contact the welding portion or the electrode terminal to sort the welding defect without the damage to the welding portion.

In regard to the implementation example, referring to FIG. 2, the first electrode current collector 2 is positioned on the first electrode terminal 1 in which the bottom surface of the sealing portion B of the secondary battery is riveted through the through-hole 13, and a welding apparatus is introduced through a winding hole of the electrode assembly opposite to the first electrode terminal in a direction of the second measurement point 12 of the first electrode current collector 2 and includes the welding portion of the first electrode current collector.

The second resistance measurement member 10 contacts the welding portion of the first electrode current collector which exists inside the secondary battery through the winding hole 5 of the electrode assembly opposite to the first electrode terminal.

For example, the cross section of the second resistance measurement member may have a shape such as a circular shape, an elliptical shape, a triangular shape, a rectangular shape, etc., but is not limited thereto.

For example, when the resistance value exceeds a threshold resistance value (e.g., 51.5 uΩ), it is judged that the welding defect occurs to sort the defective item. Further, upon normal welding, the resistance value obtained from the measurement unit may be more than 20 uΩ and equal to or less than 51.5 uΩ and upon excessive welding, the resistance value obtained from the measurement unit may be equal to or less than 20 uΩ.

In the welding quality inspection apparatus according to the implementation example, the tensile force is not applied to the welding portions of the first electrode terminal 1 and the first electrode current collector 2, and the first and second resistance measurement members 9 and 10 directly contact the welding portion or the electrode terminal, and as a result, there is no concern about the damage to the welding portion as compared with the conventional welding quality inspection apparatus. Moreover, the welding quality inspection may be performed for the first electrode current collector 2 without disassembling the battery can A to overcome a limit of the conventional welding quality inspection apparatus. Accordingly, since the welding quality inspection may be completely performed for the secondary battery while the damage to the welding portion does not occur, the defect may be prevented by achieving maintenance or enhancement of the welding quality.

According to an additional embodiment, provided is the welding quality inspection apparatus in which the diameter of the second resistance measurement member is 70% or less with respect to the diameter of the winding hole.

Selectively, the diameter of the second resistance measurement member may be 70% or less, 60% or less, or 50% or less with respect to the diameter of the winding hole.

The welding quality inspection apparatus may prevent interference between the second resistance measurement member and the electrode assembly.

According to an additional implementation example, provided is the welding quality inspection apparatus which further includes a second electrode current collector provided on the end portion of the electrode assembly opposite to the first electrode terminal of the secondary battery, in which the second electrode current collector includes a hole of the second electrode current collector provided in a portion corresponding to the winding hole of the electrode assembly.

In regard to the implementation example, referring to FIG. 2, the second electrode current collector 7 is positioned on the end portion of the electrode assembly opposite to the first electrode terminal 1. Further, a hole 7a of the second electrode current collector is formed to correspond to the winding hole 5.

The hole 7a of the second electrode current collector enables an electrolyte to be injected into the center of the second electrode current collector 7, and allows the second resistance measurement member 10 to directly contact the second measurement point 12 which exists inside the secondary battery through the hole 7a of the second electrode current collector and the winding hole 5.

According to an additional embodiment, provided is the welding quality inspection apparatus in which the diameter of the second resistance measurement member is 70% or less with respect to the diameter of the hole of the second electrode current collector.

Selectively, the diameter of the second resistance measurement member may be 70% or less, 60% or less, or 50% or less with respect to the diameter of the hole of the second electrode current collector.

In regard to the implementation example, referring to FIG. 2, the diameter of the second resistance measurement member 10 is smaller than the hole 7a of the second electrode current collector.

The welding quality inspection apparatus according to the implementation example may prevent interference between the second resistance measurement member, and the electrode assembly and the electrode current collector.

According to an additional implementation example, a ratio between the diameter of the hole of the second electrode current collector and the diameter of the winding hole of the electrode assembly is 0.8 or more and 1.2 or less, but is not limited thereto. The ratio between the diameter of the hole of the second electrode current collector and the diameter of the winding hole of the electrode assembly may be selected as an appropriate range according to the need of those skilled in the art.

According to an additional implementation example, the hole of the second electrode current collector may have a shape such as a circular shape, an elliptical shape, a triangular shape, a rectangular shape, etc., but is not limited thereto.

According to an additional implementation example, provided is the welding quality inspection apparatus in which the first electrode current collector is connected to one or more tabs of the electrode assembly of the secondary battery.

In regard to the implementation example, referring to FIG. 2, the first electrode current collector 2 may be connected to one or more tabs (included in the non-coated portion 3) of the electrode assembly 4.

For example, the first electrode includes a first current collector and a first electrode active material layer provided on one surface of the first current collector, and the first current collector includes a non-coated portion not having the first active material layer on a peripheral portion provided on one end portion side of the electrode assembly. Herein, the tab is formed from the non-coated portion or the table is formed by connecting a material such as a foil to the non-coated portion.

In the welding quality inspection apparatus according to the implementation example, the tensile force is not also applied to the welding portions of one or more tabs of the electrode assembly 4 connected to the first electrode terminal 1 and the first electrode current collector 2, and the first and second resistance measurement members 9 and 10 directly contact the welding portion or the electrode terminal, and as a result, there is no concern about the damage to the tab in addition to the welding portion as compared with the conventional welding quality inspection apparatus.

According to an additional implementation example, provided is the welding quality inspection apparatus in which each of the first resistance measurement member and the second resistance measurement member includes a current probe applying current to the first measurement point and the second measurement point and a voltage probe measuring voltage at the first measurement point and the second measurement point.

In regard to the implementation example, referring to FIG. 2 and FIG. 4, the first resistance measurement member 9 and the second resistance measurement member 10 may include a current probe 1300 applying current to the first measurement point and the second measurement point and a voltage probe 1400 measuring voltage on both surfaces of the first measurement point and the second measurement point.

Accordingly, in the welding quality inspection apparatus according to the implementation example, since the welding quality inspection may be completely performed for the secondary battery while the damage to the welding portion does not occur, the defect may be prevented by achieving maintenance or enhancement of the welding quality, as compared with the conventional welding quality inspection apparatus. Further, the resistance value may be easily determined from the current probe 1300 and the voltage probe 1400.

According to an additional implementation example, provided is the welding quality inspection apparatus in which the first electrode terminal is a cathode terminal and the first electrode current collector is a cathode current collector.

In regard to the implementation example, referring to FIG. 2, the first electrode terminal 1 may be the cathode terminal and the first electrode current collector 2 may be the cathode current collector.

In the welding quality inspection apparatus according to the implementation example, since the welding quality inspection may be completely performed for the secondary battery while the damage to the welding portion does not occur, the defect may be prevented by achieving maintenance or enhancement of the welding quality, as compared with the conventional welding quality inspection apparatus.

According to an additional implementation example, provided is the welding quality inspection apparatus in which the cathode terminal includes aluminum having a purity of 95% or more or the cathode current collector includes aluminum having a purity of 95% or more.

Alternatively, according to an additional implementation example, provided is the welding quality inspection apparatus in which the cathode terminal includes aluminum having a purity of 95% or more or the cathode current collector includes aluminum having a purity of 95% or more.

In regard to the implementation example, referring to FIG. 2, each of the cathode terminal which is the first electrode terminal 1 and the cathode current collector which is the first electrode current collector 2 may independently include aluminum having a purity of 95% or more. Preferably, each of the cathode terminal and the cathode current collector may independently include aluminum having a purity of 96% or more, 97% or more, 98% or more, 99% or more, or 99.5% or more.

In the welding quality inspection apparatus according to the implementation example, since the welding quality inspection may be completely performed for the secondary battery while the damage to the welding portion does not occur, the defect may be prevented by achieving maintenance or enhancement of the welding quality, as compared with the conventional welding quality inspection apparatus.

Further, the welding quality inspection apparatus according to the implementation example may achieve a constant welding quality or enhancement of the welding quality in spite of considering characteristics of the material constituting the secondary battery. Therefore, even though both the cathode terminal and the cathode current collector include aluminum having a high purity, it is easier to manage the welding quality, thereby providing an effect of reducing a defect rate.

According to an additional implementation example, provided is the welding quality inspection apparatus in which the cathode terminal is constituted by a rivet inserted by penetrating the bottom surface of the sealing portion of the secondary battery.

In regard to the implementation example, referring to FIG. 2, the first electrode terminal 1 in which the bottom surface of the sealing portion B of the secondary battery is riveted through the through-hole 13 is a rivet.

In the welding quality inspection apparatus according to the implementation example, since the welding quality inspection may be completely performed for the secondary battery while the damage to the welding portion does not occur, the defect may be prevented by achieving maintenance or enhancement of the welding quality.

Further, the welding quality inspection apparatus according to the implementation example may achieve a constant welding quality or enhancement of the welding quality in spite of considering characteristics of the material constituting the secondary battery. Therefore, even though both the cathode terminal and the cathode current collector include aluminum having a high purity, it is easier to manage the welding quality, thereby providing an effect of reducing a defect rate.

In particular, the implementation example is meaningful in that with the structural development of a secondary battery that achieves resistance reduction of a jelly-roll electrode assembly itself, the welding quality of the cylindrical secondary battery may be inspected more closely.

Further, a sealing property between the riveted first electrode terminal 1 and the battery can A may be remarkably enhanced.

According to an additional implementation example, the secondary battery provides the welding quality inspection apparatus which is the cylindrical secondary battery.

In regard to the implementation example, referring to FIG. 2, the first measurement point 11 is positioned on the first electrode terminal 1 exposed to the outside of the cylindrical secondary battery, and the second measurement point 12 is positioned on the welding portion of the first electrode current collector 2 inside the cylindrical secondary battery.

In the welding quality inspection apparatus according to the implementation example, since the welding quality inspection may be completely performed for the cylindrical secondary battery while the damage to the welding portion does not occur, the defect may be prevented by achieving maintenance or enhancement of the welding quality.

In particular, the implementation example is meaningful in that with the structural development of a cylindrical secondary battery that achieves resistance reduction of a jelly-roll electrode assembly itself, the welding quality of the cylindrical secondary battery may be inspected more closely.

Further, a sealing property between the riveted first electrode terminal 1 and the battery can A may be remarkably enhanced.

Further, production cost is small, mass production is easy, and energy density per volume is high.

According to an additional implementation example, provided is the welding quality inspection apparatus in which the second resistance measurement member includes a body portion, an elastic portion, and a tip portion,
    the elastic portion connects the body portion and the tip portion to each other, and adjusts a total length of the second resistance measurement member, and
    the tip portion is provided to contact a second measurement point.

Figure 3:
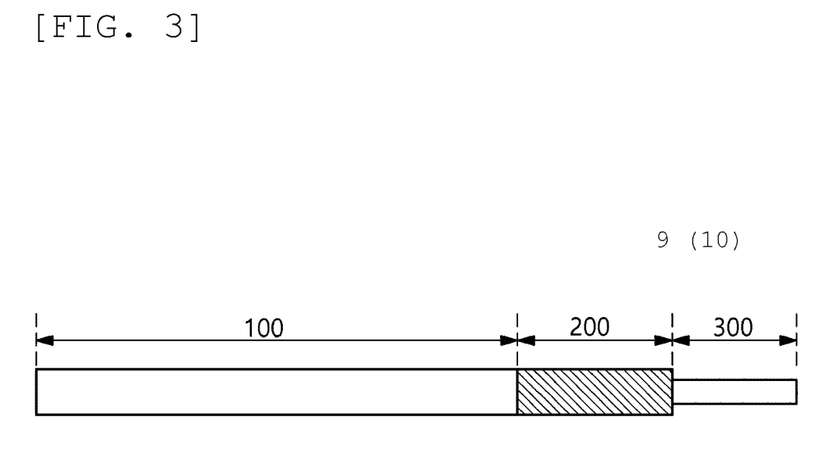
FIG. 3 illustrates a resistance measurement member used in an embodiment of the present invention.

In regard to the implementation example, referring to FIG. 3, an elastic portion 200 connects a body portion 100 and a tip portion 300 to each other.

Selectively, a member such as a spring may be installed in the elastic portion 200, and as a result, elasticity is granted when a total length of a second resistance measurement member is adjusted.

Selectively, the body portion 100 may include a head, plunger, a bearing, a collar, a sleeve, etc., but is not limited thereto.

The welding quality inspection apparatus according to the implementation example may inspect welding qualities of a first electrode terminal and a first electrode current collector regardless of a height of a battery can by adjusting the total length of the second resistance measurement member. Alternatively, the total length of the second resistance measurement member is adjusted to prevent damage to a second measurement point of a welding portion.

According to an additional implementation example, provided is the welding quality inspection apparatus in which the body portion and the tip portion include iron components, and at least one of the body portion and the tip portion is nickel-plated.

The welding quality inspection apparatus according to the implementation example may prevent corrosion from external factors such as air, moisture, etc.

According to an additional implementation example, provided is the welding quality inspection apparatus in which the elastic portion includes the iron component, and is gold-plated.

The welding quality inspection apparatus according to the implementation example provides a corrosion prevention effect and/or elasticity.

According to another implementation example of the present invention, provided is a welding quality inspection method for a welding portion of a secondary battery including an electrode assembly wound in which a first electrode, a separator, and a second electrode are stacked and wound and a first electrode current collector provided on one end portion of the electrode assembly, which includes:

(A) measuring a resistance value by directly contacting a first resistance measurement member with a first measurement point;

(B) measuring the resistance value by directly contacting a second resistance measurement member with a second measurement point; and (C) judging a welding quality by comparing the resistance values measured from steps (A) and (B) with a threshold resistance value, in which the first measurement point is positioned on a first electrode terminal exposed to the outside of the secondary battery, the second measurement point is positioned on the welding portion of the first electrode current collector provided inside the secondary battery, and the second resistance measurement member contacts the welding portion of the first electrode current collector which exists inside the secondary battery through a winding hole of the electrode assembly opposite to the first electrode terminal.

In regard to the implementation example, referring to FIG. 2, a welding quality inspection apparatus according to an embodiment of the present invention, which may be used for the welding quality inspection method is illustrated.

First, in step (A), the resistance value may be measured by directly contacting a first measurement point 11 by using a first resistance measurement member 9.

Further, in step (B), the resistance value may be measured by directly contacting a second measurement point 12 by using a second resistance measurement member 10.

Then, in step (C), the welding quality may be judged by comparing the resistance values measured from steps (A) and (B) with the threshold resistance value. Here, when the resistance values measured from steps (A) and (B) exceed the threshold resistance value, it is judged that a welding defect occurs to sort a defective item.

The first measurement point 11 is positioned on the first electrode terminal 1 exposed to the outside of the secondary battery, and the second measurement point 12 is positioned on the welding portion of the first electrode current collector which is provided inside the secondary battery.

Further, the resistance value is measured by directly contacting the second resistance measurement member 10 with the second measurement point 12 through a winding hole 5 of an electrode assembly 4 at an opening portion C of the secondary battery.

In the welding quality inspection method according to the implementation example, the tensile force is not applied to the welding portions of the first electrode terminal 1 and the first electrode current collector 2, and the first and second resistance measurement members 9 and 10 directly contact the welding portion or the electrode terminal, and as a result, there is no concern about the damage to the welding portion as compared with the conventional welding quality inspection method. Moreover, the welding quality inspection may be performed for the first electrode current collector 2 without disassembling the battery can A to overcome a limit of the conventional welding quality inspection method. Accordingly, since the welding quality inspection may be completely performed for the secondary battery while the damage to the welding portion does not occur, the defect may be prevented by achieving maintenance or enhancement of the welding quality.

According to an additional embodiment, provided is the welding quality inspection method in which the diameter of the second resistance measurement member is 70% or less with respect to the diameter of the winding hole.

According to an additional implementation example, provided is the welding quality inspection method which further includes a second electrode current collector provided on the end portion of the electrode assembly opposite to the first electrode terminal of the secondary battery, in which the second electrode current collector includes a hole of the second electrode current collector provided in a portion corresponding to the winding hole of the electrode assembly.

According to an additional embodiment, provided is the welding quality inspection method in which the diameter of the second resistance measurement member is 70% or less with respect to the diameter of the hole of the second electrode current collector.

The welding quality inspection method according to the implementation examples is described above.

According to an additional implementation example, provided is the welding quality inspection method in which the first electrode current collector is connected to one or more tabs of the electrode assembly of the secondary battery.

In regard to the implementation example, referring to FIG. 2, the first electrode current collector 2 may be connected to one or more tabs included in the non-coated portion 3) of the electrode assembly 4.

The description of the tab is the same as the above description.

In the welding quality inspection method according to the implementation example, since the welding quality inspection may be completely performed for the secondary battery while the damage to the welding portion does not occur, the defect may be prevented by achieving maintenance or enhancement of the welding quality.

According to an additional implementation example, provided is the welding quality inspection method in which step (A) is
- a step in which a resistance value is measured through a current value and a voltage value by directly contacting a first resistance measurement member 9 including a current probe applying current and a voltage probe measuring voltage with the first measurement point, and step (B) is
- a step in which the resistance value is measured through the current value and the voltage value by directly contacting a second resistance measurement member 10 including the current probe applying current and the voltage probe measuring voltage with the second measurement point.

In regard to the implementation example, referring to FIG. 2, the first resistance measurement member 9 and the second resistance measurement member 10 may include a current probe 1300 applying current to the welding portion or the electrode terminal and a voltage probe 1400 measuring voltage on the welding portion and both surfaces of the electrode terminal.

In the welding quality inspection method according to the implementation example, since the welding quality inspection may be completely performed for the secondary battery while the damage to the welding portion does not occur, the defect may be prevented by achieving maintenance or enhancement of the welding quality. Further, the resistance value may be easily determined from the current probe 1300 and the voltage probe 1400.

According to an additional implementation example, provided is the welding quality inspection method in which the first electrode terminal is a cathode terminal and the first electrode current collector is a cathode current collector.

In regard to the implementation example, referring to FIG. 2, the first electrode terminal 1 is the cathode terminal and the first electrode current collector 2 is the cathode current collector.

In the welding quality inspection method according to the implementation example, since the welding quality inspection may be completely performed for the secondary battery while the damage to the welding portion for the cathode terminal and the cathode current collector does not occur, the defect may be prevented by achieving maintenance or enhancement of the welding quality, as compared with the conventional welding quality inspection method.

In an additional implementation example, provided is the welding quality inspection method in which the cathode terminal includes aluminum having a purity of 95% or more, or
the cathode current collector includes aluminum having a purity of 95% or more.

In regard to the implementation example, referring to FIG. 2, each of the cathode terminal which is the first electrode terminal 1 and the cathode current collector which is the first electrode current collector 2 may independently include aluminum having a purity of 95% or more. Preferably, each of the cathode terminal and the cathode current collector may independently include aluminum having a purity of 96% or more, 97% or more, 98% or more, 99% or more, or 99.5% or more.

In the welding quality inspection method according to the implementation example, the welding quality inspection may be performed for the welding portions of the cathode terminal and the cathode current collector without disassembling the battery can A to overcome a limit of the conventional welding quality inspection apparatus as compared with the conventional welding quality inspection method. Accordingly, since the welding quality inspection may be completely performed for the secondary battery while the damage to the welding portion does not occur, the defect may be prevented by achieving maintenance or enhancement of the welding quality.

Further, the welding quality inspection apparatus according to the implementation example may achieve a constant welding quality or enhancement of the welding quality in spite of considering characteristics of the material constituting the secondary battery. Therefore, even though both the cathode terminal and the cathode current collector include aluminum having a high purity, it is easier to manage the welding quality, thereby providing an effect of reducing a defect rate.

According to an additional implementation example, provided is the welding quality inspection method in which the cathode terminal is constituted by a rivet inserted by penetrating the bottom surface of the sealing portion of the secondary battery.

In regard to the implementation example, referring to FIG. 2, the first electrode terminal 1 in which the bottom surface of the sealing portion B of the secondary battery is riveted through the through-hole 13 is a rivet.

In the welding quality inspection method according to the implementation example, the welding quality inspection may be performed for the first electrode current collector 2 in the secondary battery without disassembling the battery can A to overcome the limit of the conventional welding quality inspection apparatus as compared with the conventional welding quality inspection method. Accordingly, since the welding quality inspection may be completely performed for the secondary battery while the damage to the welding portion does not occur, the defect may be simultaneously prevented by achieving maintenance or enhancement of the welding quality.

In particular, the implementation example is meaningful in that with the structural development of a cylindrical secondary battery that achieves resistance reduction of a jelly-roll electrode assembly itself, the welding quality of the cylindrical secondary battery may be inspected more closely.

According to an additional implementation example, the secondary battery provides the welding quality inspection method which is the cylindrical secondary battery.

In regard to the implementation example, referring to FIG. 2, the first electrode terminal 1 in which the bottom surface of the sealing portion B of the cylindrical secondary battery is riveted through the through-hole 13 is a rivet.

In the welding quality inspection method according to the implementation example, the welding quality inspection may be performed for the first electrode current collector 2 in the cylindrical secondary battery without disassembling the cylindrical battery can A to overcome the limit of the conventional welding quality inspection apparatus as compared with the conventional welding quality inspection method. Accordingly, since the welding quality inspection may be completely performed for the cylindrical secondary battery while the damage to the welding portion does not occur, the defect may be simultaneously prevented by achieving maintenance or enhancement of the welding quality.

In particular, the implementation example is meaningful in that with the structural development of a cylindrical secondary battery that achieves resistance reduction of a jelly-roll electrode assembly itself, the welding quality of the cylindrical secondary battery may be inspected more closely.

Hereinafter, the present invention will be further described through an experimental example, but the following experimental example is to perform an experiment in order to exemplify the present invention, and as a result, the scope of the present invention is not limited thereto.

Experimental Example

Each of a cathode electrode and an anode electrode was manufactured by applying a positive active material containing lithium and a negative active material containing graphite to both surfaces, i.e., an aluminum foil and a copper foil, respectively, and then cutting the aluminum foil and the copper foil so that a tab to which an active material is not applied exists. Thereafter, a jelly-roll electrode assembly was manufactured by sequentially stacking and winding a cathode plate, a separator, and an anode plate. A cathode current collector including aluminum having a purity of 95% or more was located on a bottom surface of a sealing portion of a battery can, and the tab and the cathode current collector were connected by a conventional method. The jelly-roll electrode assembly was inserted through the opening portion of the battery can as illustrated in FIG. 2. Then, as the cathode terminal, a rivet was inserted by penetrating the bottom surface of the sealing portion of the batter can including the aluminum having the purity of 95% or more. Then, a secondary battery was manufactured by welding a first electrode current collector (cathode current collector) and a first electrode terminal (cathode terminal) having a rivet structure.

A resistance value of the rivet was measured by directly contacting a first resistance measurement member with the first electrode terminal (first measurement point) exposed to the outside of the secondary battery. Further, the resistance value was measured by directly contacting a second resistance measurement member with a welding portion (second measurement point) of the cathode current collector inside the secondary battery through the winding hole of the electrode assembly at the opening portion of the secondary battery.

For a comparison, 5 soft welding samples (Examples 1 to 5), 6 normal welding samples (Comparative Examples 1 to 6), and 5 excessive welding samples (Comparative Examples 7 to 11) were prepared. Respective measured resistance values are shown in a table below. The following resistance values are average values calculated after five measurements per sample. Here, a resistance measuring instrument made by HIOKI was used for resistance measurement.

TABLE 1

| Sample No. | Resistance value |
| --- | --- |
| Example 1 | 107.6 |
| Example 2 | 93 |
| Example 3 | 71.6 |
| Example 4 | 51.8 |
| Example 5 | 76.2 |
| Comparative Example 1 | 51.2 |
| Comparative Example 2 | 25.4 |
| Comparative Example 3 | 36.2 |
| Comparative Example 4 | 23.6 |
| Comparative Example 5 | 23.6 |
| Comparative Example 6 | 29.6 |
| Comparative Example 7 | 20.2 |
| Comparative Example 8 | 15.4 |
| Comparative Example 9 | 17.4 |
| Comparative Example 10 | 16.2 |
| Comparative Example 11 | 20.8 |

(However, when the resistance value is more than a threshold resistance value (51.5 uΩ), the soft welding, when the resistance value is more than 20 uΩ and equal to or less than 51.5 uΩ, and normal welding, and when the resistance value is equal to or less than 20 uΩ, excessive welding).

According to Table 1 above, the resistance value is measured by directly contacting the resistance measurement member with the welding portions of the cathode terminal and the cathode current collector. Accordingly, according to the present invention, a real-time welding state can be detected by measurement of a minute resistance value while minimizing damage to the welding portion.

Although the preferred implementation examples, the examples, and the implementation examples of the present invention are described through the above description, but the present invention is not limited thereto and various modifications can be made within the claims and the range of the detailed description of the invention, and this also belongs to the scope of the present invention.

The invention claimed is:

1. A welding quality inspection apparatus for a welding portion of a secondary battery that includes an electrode assembly in which a first electrode, a separator, and a second electrode are stacked and wound, and a first electrode current collector provided on one end portion of the electrode assembly, the welding quality inspection apparatus comprising:

a measurement unit including a first resistance measurement member configured to measure a first resistance value by directly contacting a first measurement point and a second resistance measurement member configured to measure a second resistance value by directly contacting a second measurement point; and a control unit judges that a welding defect occurs and sorts a defective item without damage to the welding portion when at least one of the first resistance value and the second resistance value obtained from the measurement unit exceeds a threshold resistance value, wherein the first measurement point is positioned on a first electrode terminal exposed to an outside of the secondary battery, wherein the second measurement point is positioned on the welding portion of the first electrode current collector provided inside the secondary battery, and wherein the second resistance measurement member contacts the welding portion of the first electrode current collector which exists inside the secondary battery through a winding hole of the electrode assembly at a location opposite to the first electrode terminal.

2. The welding quality inspection apparatus of claim 1, wherein a diameter of the second resistance measurement member is 70% or less than a diameter of the winding hole.

3. The welding quality inspection apparatus of claim 1, further comprising:

a second electrode current collector provided on an end portion of the electrode assembly opposite to the first electrode terminal of the secondary battery, wherein the second electrode current collector includes a hole provided in a portion of the second electrode current collector corresponding to the winding hole of the electrode assembly.

4. The welding quality inspection apparatus of claim 3, wherein a diameter of the second resistance measurement member is 70% or less than a diameter of the hole of the second electrode current collector.

5. The welding quality inspection apparatus of claim 1, wherein the first electrode current collector is connected to one or more tabs of the first electrode.

6. The welding quality inspection apparatus of claim 1, wherein each of the first resistance measurement member and the second resistance measurement member includes a current probe applying a current to the first measurement point and the second measurement point and a voltage probe measuring a voltage at the first measurement point and the second measurement point.

7. The welding quality inspection apparatus of claim 1, wherein the first electrode terminal is a cathode terminal, and wherein the first electrode current collector is a cathode current collector.

8. The welding quality inspection apparatus of claim 7, wherein the cathode terminal includes aluminum having a purity of 95% or more, or wherein the cathode current collector includes aluminum having a purity of 95% or more.

9. The welding quality inspection apparatus of claim 7, wherein the cathode terminal is constituted by a rivet penetrating a bottom surface of a sealing portion of the secondary battery.

10. The welding quality inspection apparatus of claim 9, wherein the secondary battery is a cylindrical secondary battery.

11. The welding quality inspection apparatus of claim 1, wherein the second resistance measurement member includes a body portion, an elastic portion, and a tip portion, wherein the elastic portion connects the body portion and the tip portion to each other, and adjusts a total length of the second resistance measurement member, and wherein the tip portion is configured to contact the second measurement point.

12. The welding quality inspection apparatus of claim 11, wherein the body portion and the tip portion include iron components, and wherein at least one of the body portion and the tip portion is nickel-plated.

13. The welding quality inspection apparatus of claim 11, wherein the elastic portion includes an iron component and is gold-plated.

14. A welding quality inspection method for a welding portion of a secondary battery that includes an electrode assembly in which a first electrode, a separator, and a second electrode are stacked and wound, and a first electrode current collector provided on one end portion of the electrode assembly, the welding quality inspection method comprising:

measuring a first resistance value by directly contacting a first resistance measurement member with a first measurement point;

measuring a second resistance value by directly contacting a second resistance measurement member with a second measurement point; and judging a welding quality by comparing at least one of the first resistance value and the second resistance value with a threshold resistance value, wherein the first measurement point is positioned on a first electrode terminal exposed to an outside of the secondary battery, wherein the second measurement point is positioned on the welding portion of the first electrode current collector provided inside the secondary battery, and wherein the second resistance measurement member contacts the welding portion of the first electrode current collector which exists inside the secondary battery through a winding hole of the electrode assembly at a location opposite to the first electrode terminal.

15. The welding quality inspection method of claim 14, wherein a diameter of the second resistance measurement member is 70% or less than a diameter of the winding hole.

16. The welding quality inspection method of claim 14, further comprising:

a second electrode current collector provided on an end portion of the electrode assembly opposite to the first electrode terminal of the secondary battery, wherein the second electrode current collector includes a hole provided in a portion of the second electrode current collector corresponding to the winding hole of the electrode assembly.

17. The welding quality inspection method of claim 16, wherein a diameter of the second resistance measurement member is 70% or less than a diameter of the hole of the second electrode current collector.

18. The welding quality inspection method of claim 14, wherein the first electrode current collector is connected to one or more tabs of the electrode assembly.

19. The welding quality inspection method of claim 14, wherein the first resistance value is measured through a current value and a voltage value by directly contacting the first resistance measurement member including a current probe applying a current to the first measurement point and a voltage probe measuring a voltage, and the second resistance value is measured through the current value and the voltage value by directly contacting the second resistance measurement member including a current probe applying a current to the second measurement point and a voltage probe measuring a voltage.

20. The welding quality inspection method of claim 14, wherein the first electrode terminal is a cathode terminal, and the first electrode current collector is a cathode current collector.

21. The welding quality inspection method of claim 20, wherein the cathode terminal includes aluminum having a purity of 95% or more, or wherein the cathode current collector includes aluminum having a purity of 95% or more.

22. The welding quality inspection method of claim 20, wherein the cathode terminal is constituted by a rivet penetrating a bottom surface of a sealing portion of the secondary battery.

23. The welding quality inspection method of claim 22, wherein the secondary battery is a cylindrical secondary battery.

\* \* \* \* \*